Figure 1:
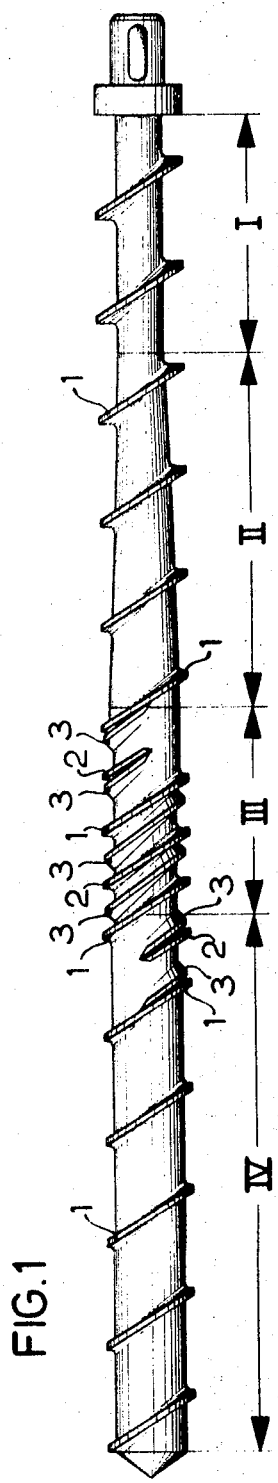

United States Patent

[11] 3,590,430

| [72] | Inventor | Hartmut Upmeier<br>Tecklenburg, Germany |
|---|---|---|
| [21] | Appl. No. | 778,476 |
| [22] | Filed | Nov. 25, 1968 |
| [45] | Patented | July 6, 1971 |
| [73] | Assignee | Windmoller & Holscher<br>Westphalia, Germany |
| [32] | Priority | Nov. 29, 1967 |
| [33] | | Germany |
| [31] | | P 17 29 394.6 |

[54] SCREW EXTRUDER
4 Claims, 2 Drawing Figs.

[52] U.S. Cl. .................................................. 18/12
[51] Int. Cl. .................................................. B29f 3/02
[50] Field of Search .......................................... 18/12, 12 SB

[56] References Cited
UNITED STATES PATENTS
3,358,327  12/1967  Maillefer ....................  18/12

FOREIGN PATENTS
1,251,409  12/1960  France ......................... 18/12 SF
420,581  3/1967  Switzerland .................. 18/12 SF

*Primary Examiner*—William S. Lawson
*Attorney*—Fleit, Gipple and Jacobson

ABSTRACT: A screw extruder for processing thermoplastic compositions comprising a feed screw having a homogenizing zone, which succeeds the melt zone. The feed screw comprises at least one additional land, which is substantially restricted to the homogenizing zone and has the same lead as the main feed land or lands of the screw. A homogenizing land having a larger lead than the feed lands branches from each feed land at the beginning of the homogenizing zone and joins the next following feed land in the longitudinal direction of the screw at the rear end of the homogenizing zone. The clearance between the homogenizing lands and the extruder cylinder is somewhat larger than the clearance between the feed lands and the extruder cylinder.

PATENTED JUL 6 1971    3,590,430

INVENTOR
Hartmut UPMEIER
By
Stevens, Davis, Miller & Mosher his ATTORNEYS

SCREW EXTRUDER

This invention relates to a single-screw extruder for processing thermoplastic compositions, preferably synthetic thermoplastic compositions and noncross-linked elastomers, in which the extruder comprises a feed screw having a melt zone, which is succeeded by a homogenizing zone. When thermoplastic compositions are processed on such screw extruders, it is difficult to ensure a perfectly uniform heating and homogenizing of the composition, particularly when the screw is rotating at a high speed, such as is desirable for an increased output and improved utilization of the screw extruder. When a conventional feed screw having no special homogenizing elements is used, there is an upper speed limit, above which particles are discharged which are not properly dispersed so that the extruded product is deteriorated and must be rejected. For this reason, numerous forms of screws have been proposed with the object of increasing this upper screw speed limit which is imposed by quality considerations.

In numerous known designs, the screw is provided at its rear end with retaining elements, such as retaining beads which extend traversely to the feed channels, or annular beads which surround the core of the screw. These retaining elements are intended to prolong the residence time of the composition in the screw so that the composition is more finely dispersed.

In other designs, so-called torpedo mixing elements are provided at the end or in an intermediate region of the feed screw and consist in the simplest case of a smooth cylindrical of slightly conical screw portion, which has a length that is approximately three times the screw diameter (3 D) and has no feed channels and defines a clearance of predetermined width with the cylinder bore. Alternatively, the cylindrical torpedo portion may be provided with additional, parallel grooves, which in many cases have a slight twist. In other known designs, the lands are interrupted, or the core of the screw is provided with eccentric kneading portions.

It is common to all known designs that the homogenizing or mixing action is improved to some extent but the output is additionally reduced and an increase in speed may cause an overheating of the material being fed. Shear-sensitive plastics materials, such as hard polyvinylchloride or cross-linking elastomers, cannot be processed with such a screw or can be processed thereon only for short times because the homogenizing elements have an adverse effect on the flow of the material and cause a local decomposition or a vulcanization to the screw.

It is an object of the invention to provide a screw which avoids the disadvantages of the known designs and feeds a uniformly homogeneous material at high screw speeds and output rates. To accomplish this object, the invention is based on the basic design of a so-called four-zone screw having a zone for drawing in the material, a zone for melting the material or for heating elastomers, a zone for homogenizing, and a pressurizing zone for the discharge of the material. In such a screw, the nonhomogeneous material which has been melted or heated should be intensely homogenized in the homogenizing zone within a short time and within a short length portion of the screw by an exactly defined shear action. Besides, the homogenizing zone should be designed to ensure that each particle of the material is subjected to that shear action only once and is then moved out of the homogenizing zone.

According to the invention, the feed screw of the above-mentioned screw extruder comprises at least one additional land, which is substantially restricted to the homogenizing zone and has the same lead as the main feed land or lands of the screw, a homogenizing land having a larger lead than the feed lands branches from each feed land at the beginning of the homogenizing zone and joins the next following feed land in the longitudinal direction of the screw at the rear end of the homogenizing zone, and the clearance between the homogenizing lands and the extruder cylinder is somewhat larger than the clearance between the feed lands and the extruder cylinder. In the screw according to the invention, the material is highly pressurized in the gradually tapering, acute-angled, triangular spaces between the trailing sides of the preceding feed lands and the leading sides of the homogenizing lands and is forced across the homogenizing lands in a direction which is opposite to the feeding direction of the screw. The resulting shear action and the influence of the differential velocity between the revolving homogenizing lands and the stationary inside surface of the cylinder result in an intense homogenization of the overflowing material. The homogenized material which has flown across the homogenizing lands is collected in the gradually flaring triangular spaces between the trailing sides of the homogenizing lands and the leading sides of the respective succeeding feed lands and is moved out of the homogenizing zone. Because the provision of the homogenizing land in the homogenizing zone in an otherwise unchanged feed screw would result in a very large increase in the resistance to the flow, an additional feed land and an additional homogenizing land associated with it are provided in the homogenizing zone. For a given width and length of the clearance defined by the homogenizing land, the resistance to the flow is reduced to one-half if there are two parallel lands, and to one-third if there are three parallel lands, compared to the resistance presented by a single land. The nonhomogeneous material which has been melted in the drawing and melt zones is thus divided into two or more parallel-flowing streams by the additional lands before the homogenization begins. Behind the outlet ends of the additional feed lands, the parallel-flowing streams of material are united in the feed channels of the discharge zone, in which the perfectly dispersed material is subjected to the extrusion pressure which is required to shape the material.

In spite of its short length, the homogenizing zone according to the invention is capable of subjecting the fed material to an intense shear action while presenting a low resistance to the flow of the material so that high throughput rates as well as a uniform homogenization are accomplished. The intense shear action enables an increase of the lead of the channels of the feed screw by about 1D compared to the usual channel lead so that the volumetric feeding rate of the screw is increased and the capacity of the screw extruder is improved.

In a development of the invention, the channels of the screw may have a larger depth in the homogenizing zone than in the other zones of the screw so that the volume of the additional feeding and homogenizing lands is compensated. It will also be desirable if the sides of the homogenizing lands are more highly inclined from the vertical than those of the feed lands. The resulting profile, which may be described as a dyke profile, results in desirable conditions of flow. The same purpose is served by the further proposal to provide the additional feed lands with knife edges of the beginning and at the rear end. This flow-promoting design of the homogenizing zone enables a processing even of thermally sensitive materials without difficulty.

The Printed German application No. 1,207,074 has disclosed a screw press, which has a feed screw provided with an additional land, which defines with the cylinder bore a larger clearance and which has a larger lead than the other feed lands. That additional land extends from the drawing zone to the rear end of the main feed land and at said rear end joins said main feed land. This design is intended to separate those particles of plastics material granules which have not yet been melted from the molten material. Hence, the additional land having a larger lead serves to accomplish an object which is different from that of the present invention. The feed screw which has been disclosed in the Printed German application 1,207,074 has not been successful in practice because it results in a melt having a nonuniform homogeneity. This is due to the fact that part of the material flows across the additional land shortly behind the drawing zone and another part flows across the additional land shortly before the rear end of the screw. Hence, the result is exactly opposite to that of the feature of the invention, which resides in that lands are provided, which are restricted to the homogenizing zone and have a larger lead and define a larger clearance than the main feed lands and are restricted to the homogenizing zone, i.e., to a region where a separation between solid and liquid portions is no longer required, and that additional feed lands are provided only in the homogenizing zone.

Figure 2:
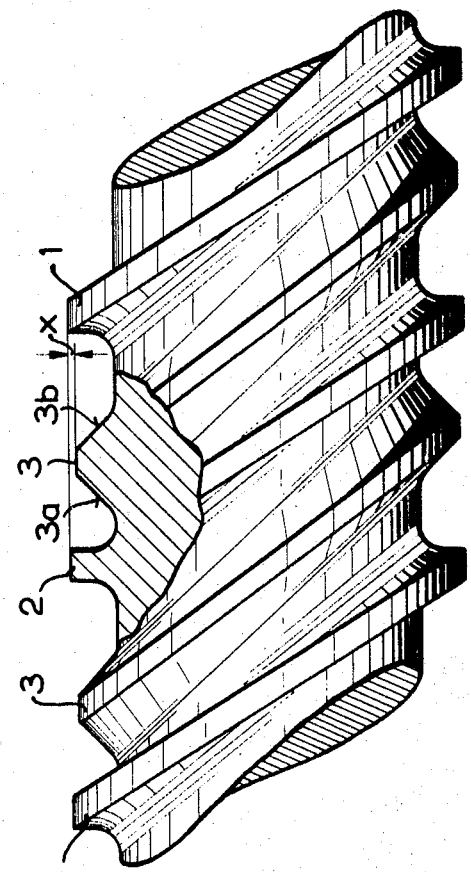

An illustrative embodiment of the invention is shown on the accompanying drawing, in which:

FIG. 1 is a diagrammatic view showing the feed screw of a screw extruder according to the invention; and FIG. 2 is a fragmentary view showing the homogenizing zone of the feed screw according to FIG. 1.

The feed screw shown in FIG. 1 comprises a drawing zone I, a melting zone II, a homogenizing zone III and a discharge zone IV. A feed land 2 provided in addition to the continuous feed land 1 beings shortly after the beginning of the homogenizing zone III and extends to a point which is closely spaced behind the rear end of said zone. The beginning and rear end portions of the feed land 2 are formed with knife edges. A homogenizing land 3 branches from the main feed land 1 at the beginning of the homogenizing zone III. A second homogenizing land 3 begins at the beginning of the additional feed land 2. As is shown in FIG. 2, the homogenizing lands 3 are smaller in height by an amount $X$ than the lands 1 and 2 and have a larger lead than the feed lands. The distance $x$ will depend on the nature of the plastics material which is to be processed.

The homogenizing land 3 which branches from the main feed land 1 joins the rear end of the additional feed land 2 behind the rear end of the homogenizing zone. The homogenizing land 3 which branches from the additional feed land 2 at the beginning thereof joins the main feed land 1 behind the homogenizing zone. The homogenizing lands 3 are provided with inclined sides $3a$ and $3b$ in order to improve the conditions of flow.

The nonhomogeneous material which has been melted in the drawing and melt zones is divided into two parallel flowing streams by the knife edge at the beginning of the additional feed land 2. Each steam is subjected to high pressure in the triangular space, which is defined between the rear side of the preceding feed land 1 or 2 and the leading side $3a$ of the homogenizing land 3, which triangular space tapers gradually at an acute angle, and the stream is subsequently forced across the homogenizing land 3 to produce the results which have been described in the introductory part of this specification. The material which has been homogenized by flowing across the homogenizing lands is collected in the gradually flaring triangular spaces between the trailing sides $3b$ of the homogenizing lands 3 and the leading sides (pressure sides) of the respective succeeding feed lands 1, 2 and is fed out of the homogenizing zone. The parallel-flowing streams of material join behind the knife edge at the rear end of the additional feed land 2 in the feed channel defined by the land 1 in the discharge zone IV. In this feed channel, the perfectly dispersed material is subjected to the extrusion pressure required to shape the material.

What I claim is:

1. A screw extruder for processing thermoplastic compositions having a feed screw rotatable within a cylinder and comprising a melting zone, a homogenizing zone located downstream of said melting zone and a discharging zone located downstream of said homogenizing zone, said feed screw comprising at least one first feed land extending through said zones, at least one second feed land substantially restricted to said homogenizing zone and having the same pitch as said first feed land, and homogenizing land means having a greater pitch than said feed lands, said homogenizing land means branching from each of said first and second feed lands, respectively, at the beginning of said homogenizing zone and joining said first and second feed lands, respectively, at the end of said homogenizing zone, the clearance between said homogenizing land means and said cylinder being greater than the clearance between said feed lands and said cylinder.

2. A screw extruder as claimed in claim 1, wherein the channels defined between said lands and land means have a greater depth in said homogenizing zone than in said melting and discharging zones.

3. A screw extruder as claimed in claim 1, wherein the sides of said homogenizing land means have a larger inclination from the vertical than the sides of said feed lands.

4. A screw extruder as claimed in claim 1, wherein said second feed land comprises knife edges at the beginning and at the end thereof.